(12) United States Patent
Rahmani et al.

(10) Patent No.: US 9,372,829 B1
(45) Date of Patent: Jun. 21, 2016

(54) TECHNIQUES FOR PREDICTING USER INPUT ON TOUCH SCREEN DEVICES

(75) Inventors: Rouhollah Rahmani, Redmond, WA (US); Srikanth Thirumalai, Clyde Hill, WA (US); Elmore Eugene Pope, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 551 days.

(21) Appl. No.: 13/327,446

(22) Filed: Dec. 15, 2011

(51) Int. Cl.
*G06F 17/21* (2006.01)
*G06F 17/00* (2006.01)
*G06F 17/24* (2006.01)

(52) U.S. Cl.
CPC ........................ *G06F 17/00* (2013.01)

(58) Field of Classification Search
CPC .......................................................... G06F 17/00
USPC .......................................................... 715/205
See application file for complete search history.

(56) References Cited

U.S. PATENT DOCUMENTS

| | | | | |
|---|---|---|---|---|
| 8,364,709 | B1* | 1/2013 | Das et al. ....................... | 707/780 |
| 2001/0049585 | A1* | 12/2001 | Gippert et al. ................. | 702/19 |
| 2003/0037041 | A1* | 2/2003 | Hertz ............................... | 707/1 |
| 2008/0214157 | A1* | 9/2008 | Ramer et al. ............... | 455/414.1 |
| 2010/0299592 | A1* | 11/2010 | Zalewski et al. .............. | 715/243 |
| 2011/0083089 | A1* | 4/2011 | Pahud et al. .................. | 715/765 |
| 2011/0276632 | A1* | 11/2011 | Anderson .............. | G06Q 30/02 709/205 |
| 2012/0047087 | A1* | 2/2012 | Amidon et al. ................ | 705/347 |
| 2012/0133589 | A1* | 5/2012 | Marsden et al. ............... | 345/168 |
| 2012/0206380 | A1* | 8/2012 | Zhao ................... | G06F 3/04883 345/173 |
| 2012/0223889 | A1* | 9/2012 | Medlock et al. ............... | 345/168 |
| 2012/0296909 | A1* | 11/2012 | Cao et al. ....................... | 707/737 |
| 2012/0304056 | A1* | 11/2012 | Detlef et al. ................... | 715/256 |
| 2013/0055097 | A1* | 2/2013 | Soroca et al. .................. | 715/738 |
| 2013/0187868 | A1* | 7/2013 | Griffin ................ | G06F 3/04886 345/173 |
| 2013/0218818 | A1* | 8/2013 | Phillips .......................... | 706/12 |

* cited by examiner

*Primary Examiner* — James J Debrow
(74) *Attorney, Agent, or Firm* — Seed IP Law Group PLLC

(57) ABSTRACT

Techniques for determining user input on a touch screen of a user device are disclosed. In some situations, the techniques include: receiving information about a user input provided to a touch screen of a user device, the touch screen displaying two or more selectable objects, wherein each of the selectable objects, if selected, initiates a response corresponding to the selection of the object, determining a selectable object among the selectable objects that has a highest likelihood of being an object that a user intended to select with the user input, and providing a response corresponding to a selection of the determined selectable object. In one situation, a selectable object is a button or a hyperlink included in a Web page displayed on the screen of the device, and the response includes content associated with the selected button or hyperlink.

25 Claims, 8 Drawing Sheets

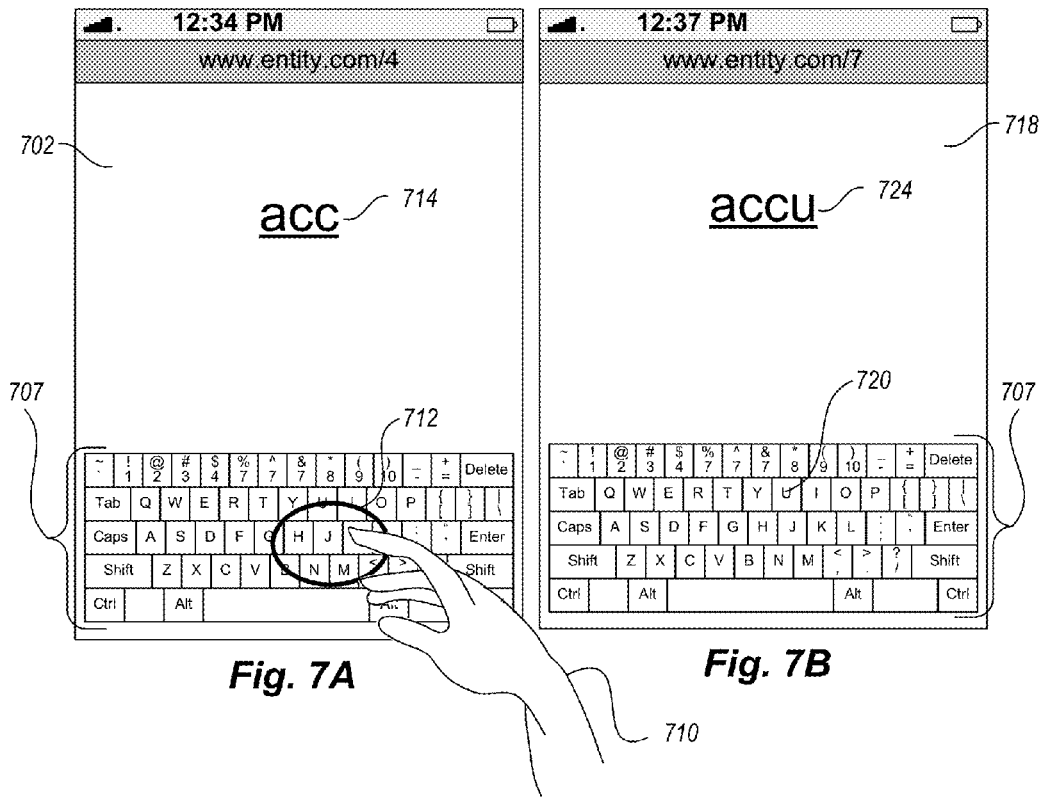
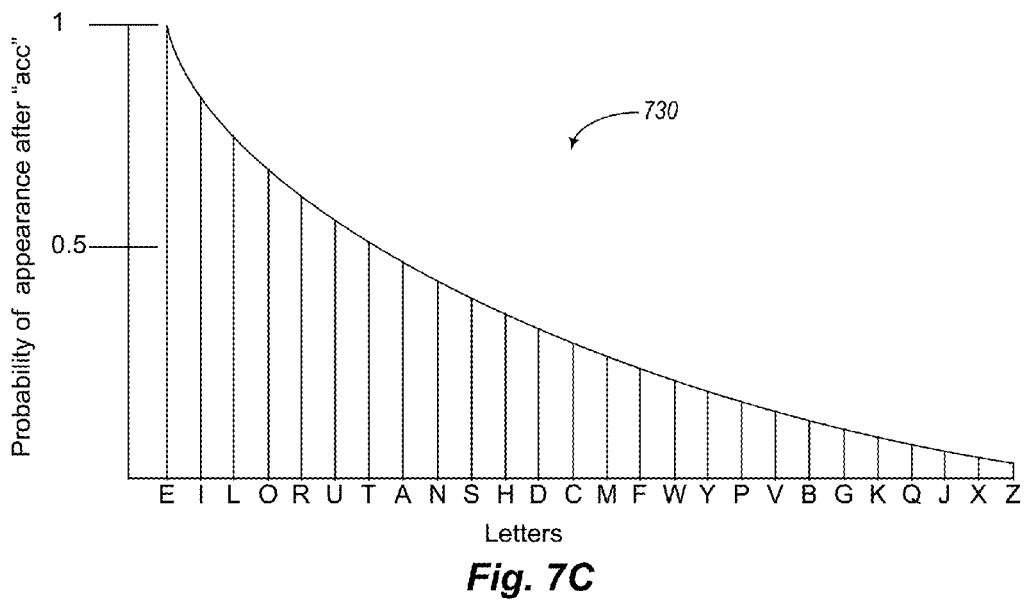

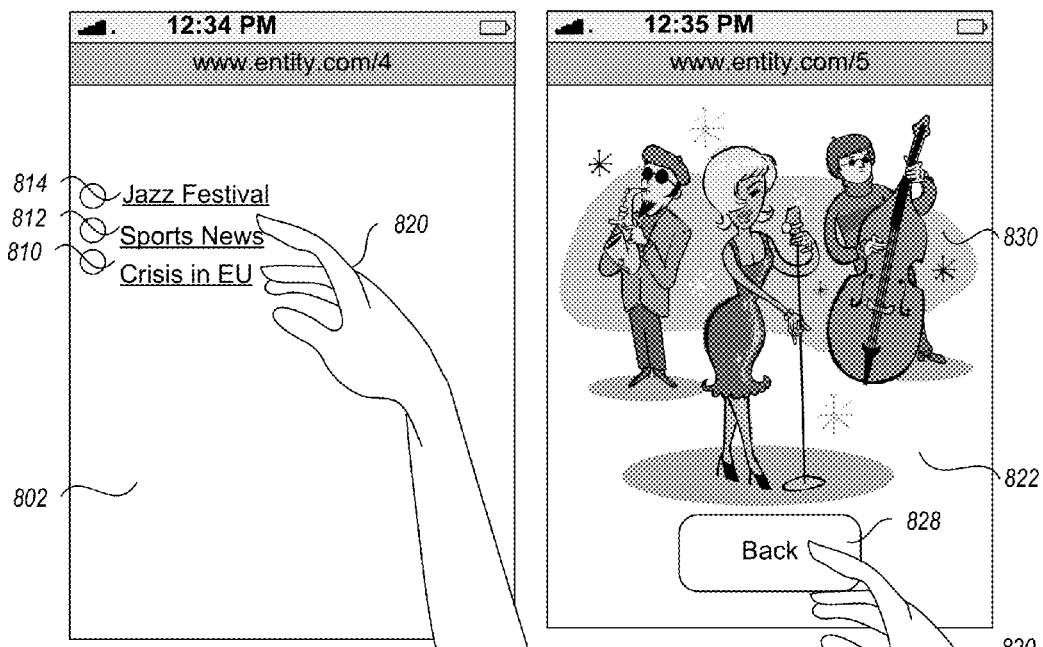
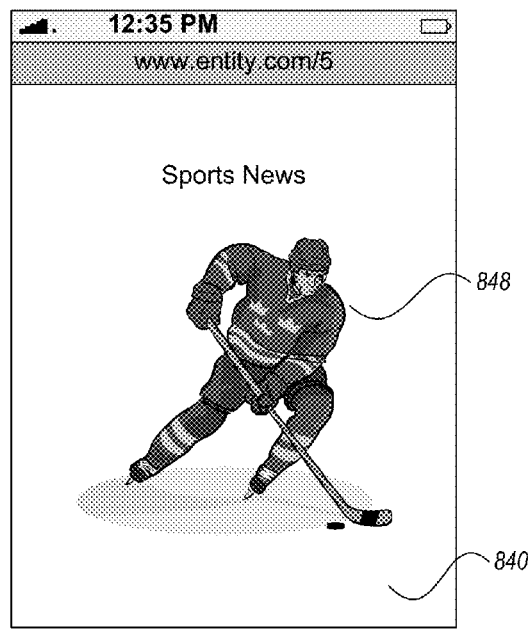
*Fig. 8A*  *Fig. 8B*
*Fig. 8C*

TECHNIQUES FOR PREDICTING USER INPUT ON TOUCH SCREEN DEVICES

BACKGROUND

A modern-day user may have a number of various electronic devices at her disposal, enabling the user to fully enjoy various ways of electronic communication, such as interactions with other users and electronic content, Internet browsing, and the like. For example, users may access items, products, video and audio content, or services through any number of network-enabled devices, such as smart phones, desktop, laptop, tablet or other computers, PDAs, pagers, electronic organizers, Internet appliances, and various other consumer products that include appropriate inter-communication capabilities. Many of these user devices have touch sensitive screens that detect the presence and location of a user touch within the display area, thus allowing users to directly interact with content displayed on the device by touch of a finger, hand, or other passive objects, such as a stylus. However, touch sensitive screens may be small and/or lack touch accuracy, and do not always provide for accurate interpretation of a user touch input. Accordingly, providing inputs via touch sensitive screens of user devices may be prone to mistakes, which may create substantial inconvenience and cause a user's annoyance.

BRIEF DESCRIPTION OF THE DRAWINGS

FIGS. 7A and 7B are more example screenshots of a user interface provided on a touch screen of a user device in accordance with an embodiment, and FIG. 7C is a graph for probabilities of appearance of each letter in the alphabet that may follow a particular letter combination.

FIGS. 8A, 8B, and 8C illustrate example screenshots of content pages provided on a touch screen of a user device in accordance with an embodiment.

DETAILED DESCRIPTION

Figure 1:
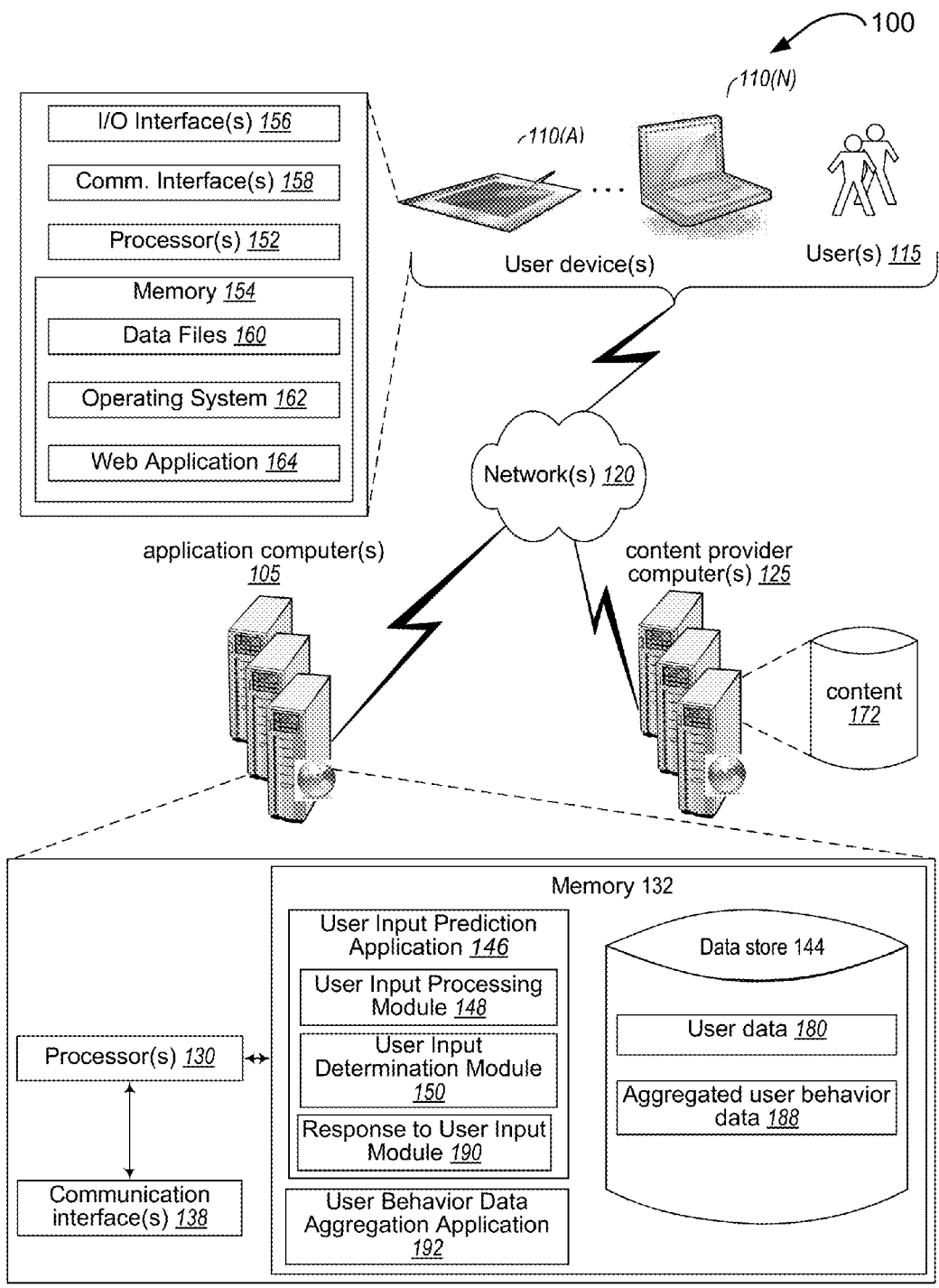
FIG. 1 illustrates an electronic environment in which various embodiments may be implemented.

Techniques are presented for predicting user input on a touch-sensitive screen (also referred to herein as a "touch screen") used to display content with which a user may interact. For example, using such a touch screen (e.g., as part of a user device), a user may interact with other users and access, view, and browse content in an electronic environment via interfaces displayed on the touch screen. Such displayed interfaces may include one or more types of user-selectable objects that a user may select in order to obtain additional functionality (e.g., additional corresponding content), such as a hyperlink object, a user interface button object, etc. However, a user selection of a user-selectable object among selectable objects provided by the interface via the touch screen may be unsuccessful if the user input is not interpreted by the user device as corresponding to an interaction intended by the user, such as if the user input is interpreted as occurring in an area between selectable objects, or if the user erroneously selects a selectable object that she did not intend to select. Accordingly, the described techniques use aggregated data based on prior behavior of one or more users in order to predict a most likely interaction performed by the user, such as to determine a most likely one of multiple possible candidate selectable objects that the user has selected, or to otherwise determine an intended user interaction in a particular situation.

For example, suppose a user is browsing items for purchase on a Web site of a retailer using her device. The user selects an item for purchase, adds the item to her virtual "cart," and clicks in a vicinity of a selectable object (e.g., button) "checkout," but not exactly on the button. The system determines, based, for example, on a repeated transaction pattern associated with an item purchase on the Web site (e.g., "select item"-"add to cart"-"checkout") that the most likely user selection after the item selection is to select the "checkout" selectable object (e.g., rather than to select one or more other selectable objects displayed on the screen, such as a "cancel" button object or a "continue shopping" button object), and proceeds to initiate a next action corresponding to selection of the "checkout" selectable object, such as to provide a Web page corresponding to a user request associated with selecting the "checkout" button. The determination that the "checkout" selectable object is the most likely user selection may include determining a likelihood score for each of some or all of the currently displayed selectable objects, with the selectable object having the highest likelihood score being selected as the result of the user interaction. Such a likelihood score for a particular selectable object may be determined based on one or more types of data, such as proximity of the user input to the displayed selectable object, information about previous actions of the user (e.g., previous interactions performed by the user, previous preference data specified by the user, etc.), historical patterns of other users' interactions in analogous situations (e.g., after selecting an "add to cart" button on the retailer's Web site), etc.

In another example, suppose a user is typing a word (e.g., "accurate") on a virtual keyboard provided on a touch screen of her user device, with each displayed key of the virtual keyboard being a distinct selectable object. The user inputs letters "a", "c", and "c", and, instead of selecting the letter "u" on the keyboard, the user erroneously selects the letter "j". The system (e.g., implemented as an application residing at least in part on the user device) may determine transition probabilities from letter "c" to a next letter in a word beginning with "acc" as typed by the user. The transition probabilities may be determined, for example, by using a Markov chain and/or using a dictionary of common words in the English language. A determination may be made that the most probable letter to appear after "c" in the letter combination "acc" is "u". Accordingly, the determined letter may appear on the screen instead of "j" typed in by the user.

A variety of techniques may be employed in a determination of a most likely user input on a touch screen of a user device. For example, a selection ("click") pattern pertaining to the user may be aggregated over time. General user behavior associated with particular types of operations by multiple users on a particular network resource (e.g., Web site) may be aggregated. The aggregated data may be used to determine a statistical probability or other determined likelihood of a correct user input. Various statistic-based techniques of determining probabilities of user selections of different selectable objects based on a user input may also be employed. In one example, a combination of one or more techniques described above may be used. The results of using each technique may be weighed in order to make a final determination regarding a highest probability or other likelihood of a selection of a particular selectable object among those considered. Thus, based on behavior data aggregated over a period of time for one or more users may be combined with predictive techniques related to determining probabilities or other likelihoods of particular user interactions in order to determine a selectable object with the highest likelihood of selection, to enable a corresponding response to the selection to be provided to the user.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes one or more electronic client (user) devices 110(A)-110(N), which can include any appropriate device operable to send and receive requests, messages, or information over an appropriate network 120 and convey information back to a user 115 of the device. Examples of such client devices include personal computers, cell phones, handheld messaging devices, laptop computers, set-top boxes, personal data assistants, tablet PCs, and the like. The client devices 110(A)-110(N) may include a processor 152 and memory 154 for storing processor-executable instructions, such as data files 160, operating system 162, and one or more web applications 164 allowing the users to interact with network resources, such as, for example, social networking Web sites. The devices 110(A)-110(N) may further include at least one or more of the following elements: input/output interface or a user interface, e.g., provided on a touch-sensitive screen of the device(s) 110(A)-110(N) 156, and communication interface 158.

The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes one or more Web servers (content provider servers) 125 for receiving requests and serving content in response thereto, although for other networks, an alternative device serving a similar purpose could be used, as would be apparent to one of ordinary skill in the art. Content provider servers 125 may serve network resources, such as Web sites accessible by the users 115 of the client devices 110(A)-110(N).

The illustrative environment 100 includes one or more application computer servers 105 including, or associated with, one or more processors 130 that may be connected to a communication interface 138 and a memory 132. The memory 132 may include, but is not limited to, a user input prediction application 146. The user input prediction application 146 may include a user input processing application module 148 storing processor-executable instructions for receiving and processing user input provided to a touch-sensitive screen of the client (user) devices 110(A)-110(N). The user input prediction application 146 may further include a user input determination application module 150 storing processor-executable instructions for determining user input or user input type based on the input provided by the user and pre-processed by the user input processing application module 148. The user input prediction application 146 may further include a response to user input application module 190 storing processor-executable instructions for determining a response to user input determined by the user input determination application module 150. The memory 132 may further include a user behavior data aggregation application 192 storing processor-executable instructions for aggregating and storing user personal behavior data associated with user interactions with particular network resources (e.g., Web sites) and the user device 110(A)-110(N), as well as the user's personal interaction data; user general behavior data associated with users' interactions with particular network resources; and input pattern data associated with spelling patterns in various languages and transaction patterns associated with particular networks (e.g., electronic marketplaces). In one embodiment, the user input prediction application 146 and user behavior data application 192 may reside and/or execute on the client device 110(A)-110(N). The applications 146 and/or 192 could execute partially or fully on the user devices in at least some embodiments.

The memory 132 may include a data store 144. The data store 144 may store at least user data 180 including, but not limited to, user account data, which may include the user's email address, location information, and other attributes specific to the user. The user data 180 may contain information about client devices associated with the user (e.g., device ID). The user data 180 may be used if a user accesses a network resource (e.g., a Web site) provided by the content provider computers 125 that requires user registration with the network resource. The data store 144 may further include aggregated user behavior data 188 containing data aggregated by the user behavior data aggregation application 192. In one embodiment, information stored in the data store 144 may reside, at least in part, or be accessible by, the client device 110(A)-110(N).

The user input prediction application 146 may be configured, when executed, to receive a user input provided to a touch-sensitive screen of a client (user) device 110(A)-110(N) via the user input processing application 148, determine user input type via the user input determination application 150, and, if the input type is determined to be other than a mistouch or a scroll, determine intended user input based on information associated with the user input. In the user input determination, the user input prediction application may utilize user behavior data aggregated by the user behavior data aggregation application 192. Once the intended user input is determined, the user input prediction application may provide a response to the user input via the response to user input application module 190.

It should be understood that there can be several application servers, layers, or other elements, processes, or components, which may be chained or otherwise configured, which can perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example.

The handling of requests and responses between client devices 110(A)-110(N) and content providers, as well as the delivery of content 172 (e.g., Web sites with which the users 115 may interact via the touch screen of their user devices) to client (user) devices 110(A)-110(N) can be handled by the content provider computer server(s) 125. Content provider computer server(s) may include an operating system that provides executable program instructions for the general administration and operation of that server, and may include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The data store 144 can include several separate data tables, databases, or other data storage mechanisms and media for storing data relating to a particular aspect. For example, the data store illustrated includes mechanisms for storing production data and user information. The data store may include a mechanism for storing communication log data, which can be used for reporting, generating recipient groups, updating recipient groups, and other such purposes. It should be understood that there can be many other aspects that may need to be stored in the data store, such as page image information and access right information, which can be stored in any of the above-listed mechanisms as appropriate or in additional mechanisms in the data store 144.

The environment described herein is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the environment 100 in FIG. 1 should be taken as being illustrative in nature, and not limited to the scope of the disclosure.

Figure 2:
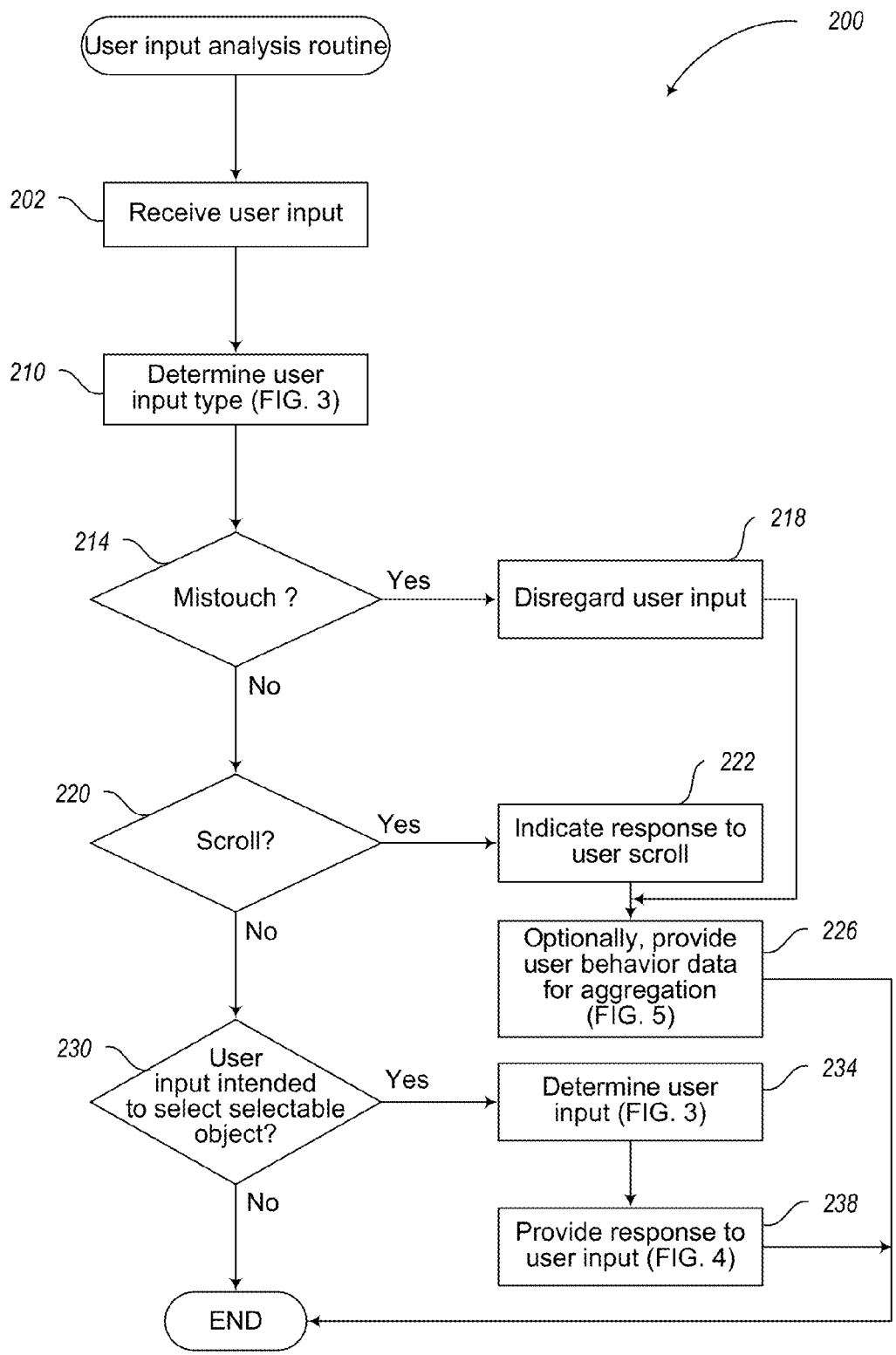
FIG. 2 illustrates a process flow diagram for user input analysis in accordance with an embodiment.

FIG. 2 is a process flow diagram for user input analysis in accordance with an embodiment. The process 200 begins at block 202, where a user input provided to a touch screen of the user device is received. The user input may be provided in a number of different ways. For example, the user may touch the screen with her finger or other selecting element, such as a stylus. At block 210, a type of input may be determined with the user input determination routine described below in reference to FIG. 3. User input type may vary and depend on user factors specific to the user, such as user age, gender, shape of user's hand, vision, coordination, modes of operating the device (e.g., while driving, riding a bus, etc.) and the like. For example, a user may habitually "drag" her finger when clicking selectable objects on the device screen. The user may accidentally touch the screen or touch the screen where the user input is not expected ("mistouch"). The user may touch the screen in the "gray area," such as between selectable objects (e.g., buttons on a virtual keyboard) or in an area proximate to a number of selectable objects. The input determination routine (FIG. 3) may determine the type of user input and return the results accordingly.

When a user touches the screen in vicinity of two selectable objects, for example, a variety of methods of disambiguating between the two selectable objects may be employed. For example, Voronoi diagrams may be created to identify "clickable areas" associated with each selectable object, such as a button, a hyperlink or other selectable object. A user input within an identified "clickable area" surrounding a selectable object may be a factor in determining an intended user input, along with other user input determination techniques described herein.

At decision block 214, it is determined whether the user input is a mistouch. If the user input is determined, according to the results of the user input type determination (210), to be a mistouch, at block 218 the user input is disregarded. Optionally, the user behavior associated with a mistouch may be provided for aggregation to a user behavior data aggregation routine (FIG. 5) at block 226. If it is determined that the user input is not a mistouch, at decision block 220 it is determined, according to the results of the user input type determination (210), whether the user input is a scroll. If the user input is determined to be a scroll, at block 222 a response corresponding to the user scroll is indicated on the screen of the device. Optionally, the user behavior associated with a scroll may be provided for aggregation to the user behavior data aggregation routine (FIG. 5) at block 226. If the user input is determined not to be a scroll, at decision block 230 it is determined, according to the results of the user input type determination (210), whether the user input was intended to be a selection of a selectable object. If the user input was intended to be a selection, at block 234 a user input determination process occurs as described in reference to FIG. 3 below. At block 238, a response to the user input determined at block 234 is provided to the user as described below in reference to FIG. 4. The input type determination may not be limited to determining whether a user input is a scroll or mistouch. Other types of input may be determined. For example, it may be determined whether a user input type is a "page turner," e.g., when the user input is aimed at moving from one page of content presented on the touch screen to another (next) page of content.

Figure 3:
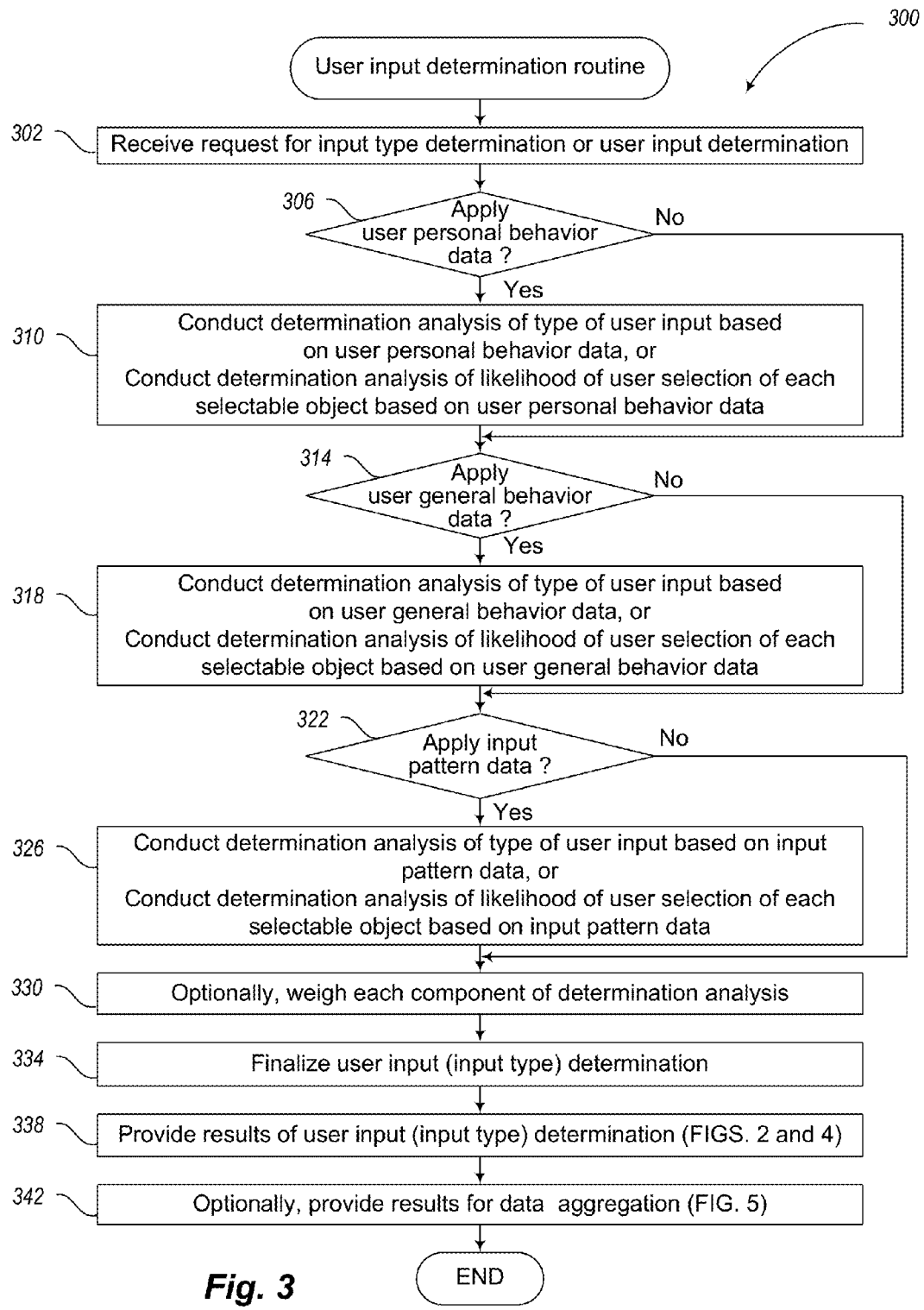
FIG. 3 illustrates a process flow diagram for user input determination in accordance with another embodiment.

FIG. 3 is a process flow diagram for user input determination in accordance with an embodiment. The process 300 begins at block 302, where a request to determine user intended input or to determine user input type is received. As described above, the user input information may be provided in association with a request to determine user input type (FIG. 2, block 210) or with a request to determine user input (FIG. 2, block 234). For example, information indicating the user input (touch) that is proximate to at least two or more selectable objects on the touch screen of a user device may be received with the request to determine user input. In another example, information indicating the user "scroll-like" input relative to a particular screen area may be received with the request to determine user input type.

At decision block 306, it is determined whether user input determination or user input type determination is based on user personal behavior data aggregated by the user behavior data aggregation process described below in reference to FIG. 5. If it is determined that the user personal behavior data should be used in the determination analysis, at block 310 a determination analysis based on applicable personal user behavior data is conducted. For example, user behavior, such as input (e.g., "click") patterns specific to the user may be used in the user input type determination. For example, a user may habitually "drag" her finger between clicking selectable objects (e.g., buttons), such as the user may "drag" her finger after a "click" on the first button toward the second button. Accordingly, it may be determined that the user intended to only click the first button, but not both buttons, or that the user intended to scroll down and not click, depending on the user repeated pattern of behavior. Generally, user input type determination is likely to involve using the user personal behavior data because the user personal behavior data contains aggregated patterns of user input reflecting individuality of the user based on features pertaining to the user, such as gender, age, size of user's hand, user habits related to interacting with touch-screen devices, and the like.

A determination of user input related to a user interacting with content provided, for example, by a browser associated with a user device (e.g., smartphone) and displayed on a touch screen of the device may also be based on user personal behavior data, although not exclusively. User input determination may also be based on user general behavior data as described below, or a combination thereof. A decision to use the user personal behavior data in the user input determination may depend on a type of content accessed by the user. For example, aggregated user preferences in selecting particular content may be applied when the user input determination relates user accessing a particular network resource (e.g., a Web site) and attempts to select a certain type of content. User preferences may be used to determine what type of content user intended to retrieve as described in the example below.

A decision to use the user personal behavior data in the user input determination may depend on a selectable object or type of object with which the user is interacting. For example, if the user input relates to a virtual keyboard displayed on a touch screen of a user device, it may be determined that the user personal behavior data should be used. For example, user-specific dictionary having user-associated vernacular may be used as described below in greater detail.

Consider an example of using user personal behavior data in the user input determination. Suppose a user touches a touch screen of the user device in proximity to two or more hyperlinks included in a Web page rendered by a browser on the touch screen. A hyperlink most likely intended to be selected by the user may be determined based on the aggregated personal behavior of the user with regard to the Web page or with regard to content that user prefers to frequent (e.g., user personal preferences in selecting particular types of content). For example, it may be determined that the user typically reads a particular type of content (e.g., news regarding celebrities). Accordingly, if the user touched the screen around a number of hyperlinks including one linking to the celebrity news, it may be inferred that the user intended to select this particular link. Content associated with the selection of the link may then be presented to the user as described in greater detail in reference to FIG. 4.

Consider another example of user input determination involving user personal behavior data. This example relates to a user typing on a virtual keyboard displayed on a touch screen of the user device. To assist in user input determination in this case, a personal vocabulary of the user may be assembled, stored (as described in reference FIG. 5 below), and utilized in user input determination. For example, the user may habitually use a particular vernacular, abbreviations, and the like that are pertinent to the user's personal preferences, her work-related activities, and the like. The user may use particular acronyms that pertain to the user's occupation. Accordingly, a personal dictionary associated with the user may be created over time, stored, and utilized, for example, when the user is typing a word or an acronym that is included in the dictionary. If the user appears to have mistyped a letter while inputting a word or acronym with a virtual keyboard, the already entered part of the word (acronym) may be compared to the words (acronyms) stored in the dictionary and, if a match is found, the user's incorrect input may be corrected by causing a correct letter to be entered instead of the mistyped one.

The user feedback data may be used in the user input determination. For example, the user personal behavior associated with the negative feedback to user inputs provided by the techniques described herein may be recorded and used subsequently in similar user input situations. The user feedback use will be described in greater detail in reference to FIGS. 4 and 5.

At decision block 314 it is determined whether user input determination or user input type determination is based on user general behavior data aggregated by the user behavior data aggregation process described below in reference to FIG. 5. A decision to use the user general behavior data in the user input determination may depend on a type of content and/or network resource accessed by the user. If it is determined that the user general behavior data should be used in the determination analysis, at block 318 a determination analysis based on applicable user general behavior data is conducted. For example, a user input may be determined based on aggregated user general behavior with regard to accessing a particular network resource. Accordingly, general behavior data may be invoked in the user input determination when the user interacts with network resources frequented by other users, such as an online newspaper, a social networking Web site, an online merchant Web site, and the like. General behavior data may be obtained from different communities of users. For example, behavior data related to users' accessing a particular network resource may be aggregated and used in the determination analysis. In another example, behavior data of user communities that are associated with the user may be utilized, such as user's "friends" on social networking resources, members of the user's chat group, blog subscribers, and other types of user communities in which the user may take part.

For example, suppose a user is viewing a particular Web site rendered on the user device. If the user touches the touch screen of the user device in proximity to two or more hyperlinks rendered on a Web site, a hyperlink most likely intended to be selected by the user may be determined based on the aggregated user behavior with regard to the Web site. Thus, it may be determined that a majority of users selected a particular one of the two or more hyperlinks. It may be inferred that a user most likely intended to select the hyperlink favored by the majority of users, and the content associated with that hyperlink may be presented to the user accordingly.

At decision block 322 it is determined whether user input determination or user input type determination is based on input pattern data aggregated by the user behavior data aggregation process described below in reference to FIG. 5. Input pattern data may be used in the user input determination or user input type determination in a number of different situations. For example, a decision to use the input pattern data in the user input determination may depend on a type of content accessed by the user, a type of network resource accessed by the user, and a type of selectable object(s) with which the user is interacting (e.g., virtual keyboard). In another example, if a user input determination relates to determining user input type (e.g., a request to determine input type is received from block 210 of the user input analysis routine), the input pattern data may always be invoked. If it is determined that the input pattern data should be used in the user input determination or user input type determination, at block 326 user input determination or user input type determination based on the input pattern data is conducted.

One example of input pattern data is transaction pattern. Transaction pattern, such as a sequence of user actions associated with a particular activity and/or particular network resource (e.g., a Web site) may be determined, stored and utilized for user input determination. For example, a transaction pattern associated with purchasing products on a Web site may be determined and recorded. Accordingly, if a user unsuccessfully attempts to select a particular selectable object (e.g., by touching a touch screen in a vicinity of two different links), a desired link may be identified based on the recorded transaction pattern, and the associated content presented to the user.

In another example, patterns associated with particular word spellings may be determined, stored, and used in an instance of user interaction with a virtual keyboard rendered by a touch screen of a user device. For example, suppose a user is typing a word on a virtual keyboard rendered on the touch screen of a user device. Suppose further that a part of the word is already entered and the user is entering a letter following the ones already entered. If the user mistypes the letter, a letter that has a highest probability of following already entered letters may be determined based on an established spelling pattern. For example, the letter that most likely follows already entered letters in a word may be established using statistical probability mathematical modeling methods (e.g., Markov chain). The statistical probability methods determine probabilities for transitioning from one letter to another based on statistical analysis of English language words, for example. Thus, if a user is typing out a word on a virtual keyboard and the current user input (e.g., touch) occurs in the area of four letters, each of the four letters may be analyzed to determine a probability of appearance of the letter after the letters already input by the user. The analysis may based on a corpus of words as spelled in the dictionary, for example. In another example, the user's personal dictionary aggregated as discussed above may be used in the determination analysis. The letter with the highest determined probability may be selected to appear on the screen as described in greater detail in reference to FIGS. 6A, 6B, and 6C.

In another example, the user-specific input pattern may be invoked in user input type determination. User input type may vary and depend on user factors specific to the user, such as user age, gender, shape of user's hand, vision, coordination, modes of operating the device (e.g., while driving, riding a bus, etc.) and the like. Accordingly, based on the aggregated user-specific parameters in regard to various patterns of user input on a touch screen of a user device, it may be determined whether the input type is a scroll, a mistouch, or an attempt at selecting a selectable object displayed on the touch screen of the user device. The results of the user input type determination may be provided to the user input analysis routine (FIG. 2) as described below.

At block 330, optionally, each component of user input determination or user input type determination is assigned a particular weight. For example, as described above, user input determination in regard to a particular network resource and/or type of content may involve user personal behavior data and user general behavior data. The results of user input determination based on either technique may be assigned a weight value corresponding to the probability of each determination outcome. For example, it may be determined, using user personal behavior data, that the user intended to select a first hyperlink of the three hyperlinks included in a Web page rendered to the user on the user device (e.g., based on user personal preferences, for example, for celebrity gossip). It may be further determined, using user general behavior data, that the user intended to select a second hyperlink of the three hyperlinks included in a Web page (e.g., based on a majority of users selecting the second hyperlink, such as sports news). Both user input determination outcomes may be assigned a weight value depending on a number of considerations. For example, it may be determined that user's personal preferences may typically outweigh general user preferences. Accordingly, the first hyperlink may be assigned a weight value that is higher than a weight value assigned to the second hyperlink.

At block 334 the results of the input determination analysis may be finalized. In the above example, the first hyperlink may be selected as a first option for determined user input, and the second hyperlink may be selected as a second option for determined user input. At block 338 the results of the prediction analysis are provided in response to the request received at block 302. For example, the results of the user input type determination may be provided to the user input process (block 210 in FIG. 2). The results of the user input determination may be provided to the response to user input process (block 406 in FIG. 4) described below in greater detail. At block 342, the results of user input (input type) determination may be provided for user behavior data aggregation described in reference to FIG. 5.

Figure 4:
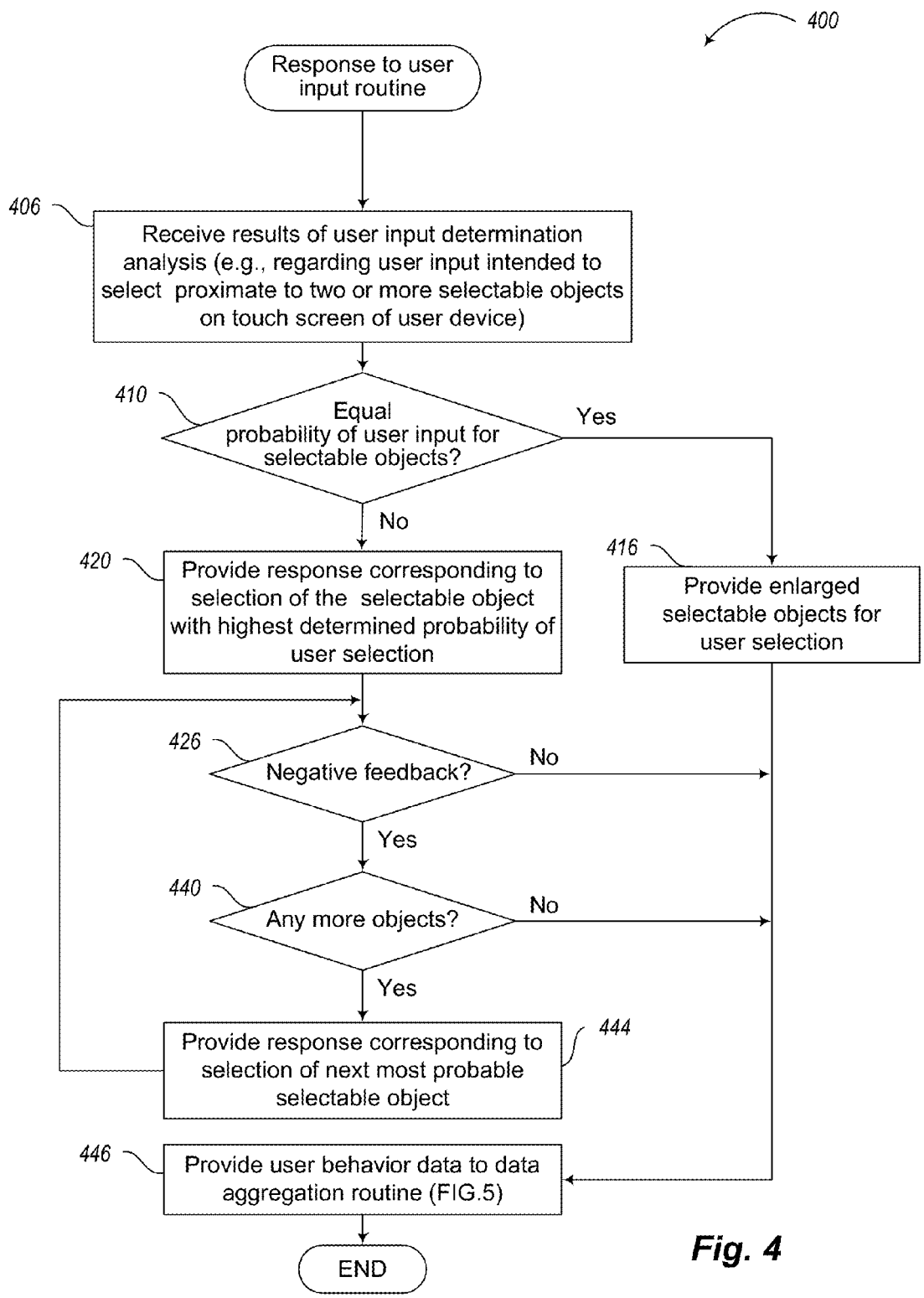
FIG. 4 illustrates a process flow diagram for providing a response to user input on a touch screen of a user device in accordance with an embodiment.

FIG. 4 is a process flow diagram for providing a response to user input on a touch screen of a user device in accordance with an embodiment. The process 400 may be performed by one or more applications described in relation to FIG. 1. For example, the process 400 may be performed by executing the application for providing a response to a user input in combination with the user input determination application and the user interface application.

The process 400 begins at block 406, where user input determination results are received from the user input determination process (block 338 in FIG. 3). For example, if a user input on a touch screen of a user device was detected proximate to two or more selectable objects (e.g., hyperlinks, buttons, and the like), the probabilities for the user intended selection of each selectable object are determined as described in reference to FIG. 3 and provided in block 406.

At decision block 410, it is determined whether the probability of user selection of each of the selectable objects is the same or similar within a determined margin of error. If the probability of user input for each of the selectable objects is determined to be the same or similar, or the user intended input may not be determined, the process moves to block 416. At block 416, additional techniques assisting the user in making an unambiguous selection of a desired selectable object on the touch screen may be employed. For example, the selectable objects proximate to the user input may be enlarged and rendered on the device screen so as to make a selection of a desired element easier for the user. The process then moves to block 446.

If at least one probability of user selection of a selectable object is different than the probabilities of user selection of other selectable objects (e.g., higher or lower), the process moves to block 420, where a response associated with a user selection of the selectable object with the highest probability of selection is provided. For example, if a user input was provided in proximity to three hyperlinks, content associated with the hyperlink of the three hyperlinks that has the highest determined probability of user selection is rendered on the screen of the user device.

At decision block 426 it is determined whether a negative feedback from the user is received. For example, the user may realize that the provided content is not a correct response to her intended selection. In other words, the intended selectable object may have been identified incorrectly and, accordingly, a response that the user considers to be erroneous was provided. The user then may negate the erroneous selection, for example, by selecting a "back" button on the browser which renders the content on the user device. If the negative feedback is not received, the process moves to block 446, where the user behavior data corresponding to the user behavior in regard to the above process is provided for aggregation using, for example, the user behavior data aggregation routine described below in reference to FIG. 5.

If the negative feedback is received, at decision block 440 it is determined whether there are any more selectable objects to consider. In the above example of three hyperlinks, there are two remaining hyperlinks to consider. If there are no more objects, the process again moves to block 446, where the user negative feedback may be provided for the user behavior data aggregation routine (FIG. 5). For example, the user behavior associated with the negative feedback may be recorded and used subsequently should a similar situation occur. Specifically, next time a similar user input is received for the same selectable objects, it may be inferred from the recorded negative feedback that the user did not intend to select a hyperlink that was negated by the user.

If it is determined at block 440 that there are more selectable objects to consider (e.g., two remaining hyperlinks in the above example), the process moves to block 444, where a response associated with a selection of the next most probable selectable object is provided. For example, content associated with the hyperlink of the two remaining hyperlinks that has the second highest determined probability (among three hyperlinks) of user selection is rendered on the screen of the user device. The process then circles back to decision block 426 and the loop 426-440-444 repeats until all selectable objects have been considered and the relevant user behavior data is provided for data aggregation at block 446. The process 400 then ends.

In an embodiment, if a determined number of negative feedbacks (e.g., selections of the "back" button) are detected (e.g., at block 426), the user input determination process may be terminated. Alternatively, if a consistent trend for negative feedback is detected, the input determination process may "wind down" in a gradual manner. For example, determinations regarding possible user selections may terminate after three negative feedbacks provided in regard to a user input. Then, determinations regarding possible user selections may terminate after two negative feedbacks provided in regard to another user input. Finally, determinations regarding possible user selections may then terminate after one negative feedback provided in regard to yet another user input.

Figure 5:
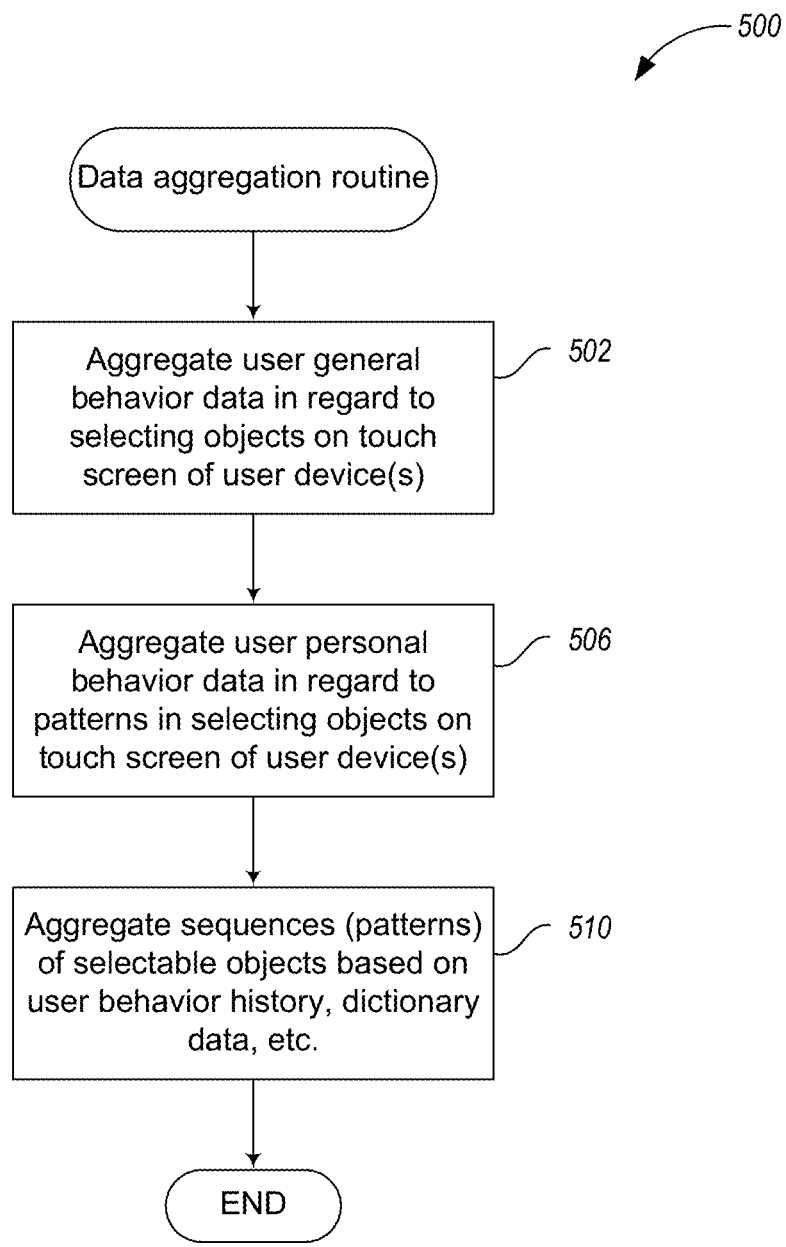
FIG. 5 illustrates a process flow diagram for user behavior data aggregation in accordance with an embodiment.

FIG. 5 is a process flow diagram for a user behavior data aggregation routine. As described above, different types of user behavior data pertinent to personal behavior of a particular user or general user behavior associated with a particular network resource (e.g., Web site) may be accumulated, stored, and invoked for user input type determination or user input determination and response to the determined user input.

The process 500 begins at block 502, where user general behavior data in regard to selecting objects on the touch screen of a user device is aggregated. For example, user general behavior data with regard to a particular network resource may be aggregated and used in the user input determination in relation to user interaction with network resources frequented by other users. For example, general user preferences in selecting particular selectable objects on particular network resources may be accumulated and used in the user input determination analysis, for example. Thus, it may be determined that a majority of users tend to select a particular hyperlink on a Web site frequented by many users. Accordingly, this information may be used in determining the most probable user input if the user, for example, touched an area on a touch screen of the user device between this hyperlink and another hyperlink that is less likely to be selected by a majority of users.

At block 506, user personal behavior data in regard to patterns in selecting objects on the touch screen of a user device is aggregated. For example, a user behavior in relation to providing inputs on a touch screen of a user device may be aggregated and the input (e.g., "click") patterns specific to the user determined and stored. As described above, user click patterns may be based upon a variety of factors, including, but not limited to, user age, gender, shape of user's hand, vision, coordination, modes of operating the device (e.g., while driving, riding a bus, etc.) and the like. A personal vocabulary, such as the words most commonly used by the user, user-specific expressions, abbreviations, or acronyms may also be aggregated and stored for using in the user input determination process. Further, user preferences in selecting particular types of content in general or as relates to particular content resources may be aggregated and stored. For example, it may be determined that the user typically reads a particular type of content. Accordingly, if the user touched the screen around a number of selectable objects including one linking to the user's favorite content, it may be inferred that the user intended to select this particular hyperlink. In another example, user preferences in conducting searches on electronic marketplaces may be also aggregated and stored for future use in the user input determination process.

User feedback data associated with user activities on network resources may be aggregated and stored for use in the user input determination process. For example, as discussed in reference to FIG. 4, the user may provide negative feedback regarding the user input determination and corresponding response provided by the system. For example, if the user input is determined to be a first selectable object among two selectable objects that were considered, and the response to the selection of the object is provided accordingly, the user may not accept the response if the response turns out to be erroneous. The user input determination may then be adjusted in view of the feedback provided by the user and stored by the system. For example, the user input in the same selection situation may be determined to be a second of the two selectable objects.

At block 510 different input patterns may be aggregated. For example, transaction patterns associated with a particular user activity on a network resource (e.g., a electronic marketplace) may be determined, stored and utilized for user input determination. Spelling patterns associated with particular word spellings in languages utilized by the user may be determined, stored, and used in an instance of user interaction with a virtual keyboard rendered by a touch screen of a user device. For example, dictionaries in various languages may be stored by the system and used in the statistical probability analysis associated with particular letter sequences input on a virtual keyboard by the user as described in reference to FIG. 3.

Figures 6A, 6B:
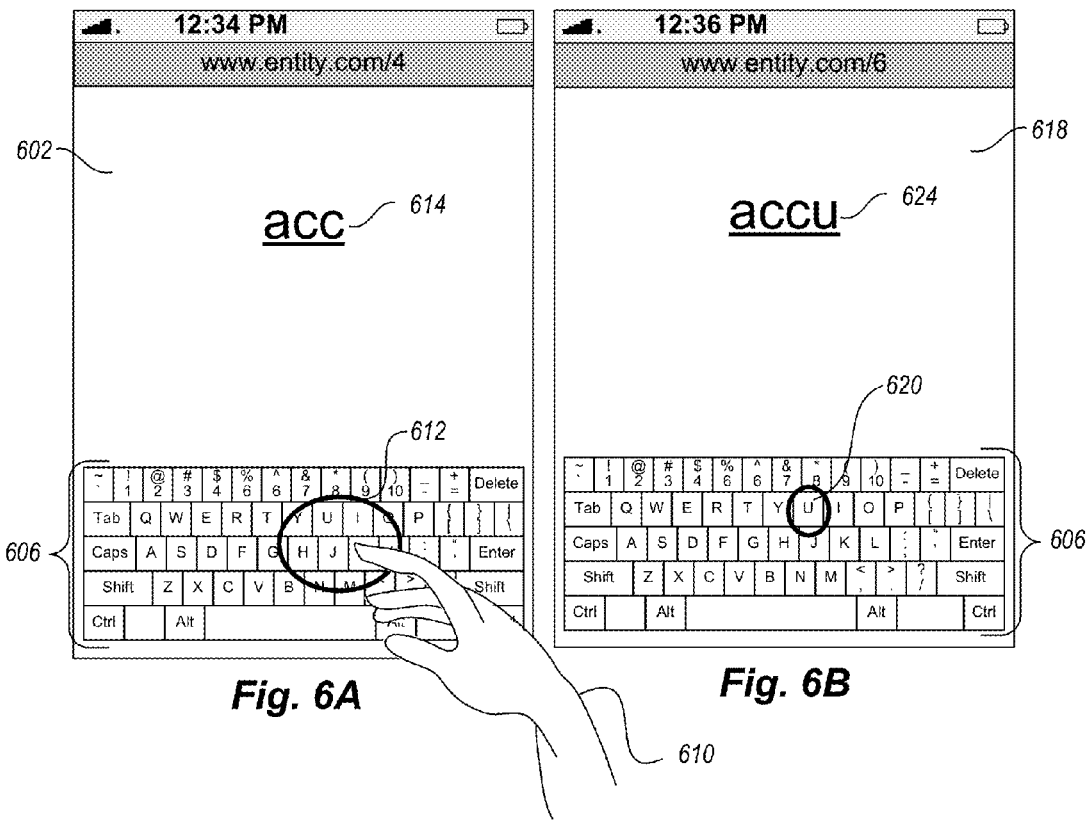
FIGS. 6A, 6B, and 6C illustrate example screenshots of a user interface provided on a touch screen of a user device in accordance with an embodiment.

FIGS. 6A and 6B illustrate example screenshots of user interfaces 602 and 618 displayed on a touch screen of a user device in accordance with an embodiment. The screenshots illustrated in FIGS. 6A and 6B are shown for illustrative purposes only and should not be interpreted as limiting the scope of the various embodiments. The interface 602 includes a virtual keyboard 606 displayed to the user for typing in text (e.g., a text message, email, notes and the like) that may be stored or transmitted by the user device. As shown in FIG. 6A, the user began typing a word 614 beginning with letters "a", "c", and "c." As shown, after typing "acc," the user is touching the screen with her finger 610 in the area 612 on the keyboard 606.

Figure 6C:
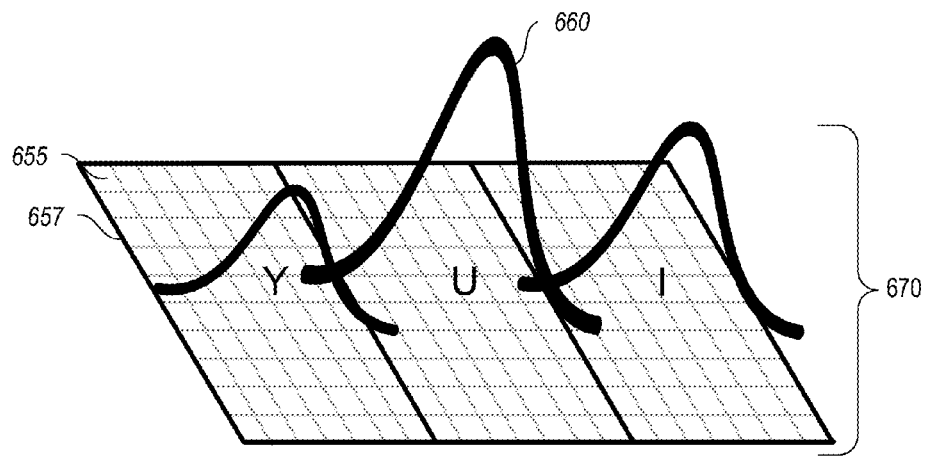

As discussed above, the touch screens with low sensitivity may detect an area 612 in which the touch occurred (e.g., an area including letters "o", "b", "u", "i", "h", "n", "m", "g", "k", "l", and "y" as shown in FIG. 6A). In this case, it may be determined which letter the user intended to enter. FIG. 6C is a schematic illustration of a portion 670 of the area 612 with associated probability graphs 660. With reference to FIG. 6C, each pixel (e.g., 655) on the virtual keyboard may be assigned a symbol (e.g., letter) which has the highest probability of appearance after "acc" at that pixel. Probabilities of appearance may be highest at the centers of each selectable object (e.g., key 657). The probability distribution function associated with each selectable object may be a Gaussian function with two-dimensional domain (shown by the "bell curve" 660). For example, for the area 670 in FIG. 6C, the likelihood of the user touching "u" may decrease with the increase of a distance from the center of the selectable object representing "u". The standard deviation of the probability density function (PDF) is based on the likelihood of the letter being the right one. At every pixel, the probabilities for every selectable object (e.g., key 657) may be determined and the key that is the most probable selection of the user may be identified.

Based on comparing the probabilities associated with each pixel comprising selectable objects associated with each letter within the area 612 (e.g., areas of sensitivity for "o", "b", "u", "i", "h", "n", "m", "g", "k", "l", and "y") it may be determined, for example, that the user most likely intended to select the selectable object representing "u". Accordingly, a determination may be made that the most probable letter to appear after "c" in the letter combination "acc" is "u" and not any other letter in the area 612 or outside of the area 612.

FIG. 6B illustrates the screenshot of the interface 618 following the determination of the user selection of the letter "u" 620 after "acc" determined as described above. The determined most probable letter (e.g., "u" 620) may appear on the screen 618, so that the resulting letter combination is "accu" 624.

FIGS. 7A, 7B, and 7C illustrate example screenshots of user interfaces 702, 718, displayed on a touch screen of a user device in accordance with an embodiment as well as the probability graph 730. The screenshots illustrated in FIGS. 7A and 7B are shown for illustrative purposes only and should not be interpreted as limiting the scope of the various embodiments. The interface 702 includes a virtual keyboard 707 displayed to the user for typing in text (e.g., a text message, email, notes and the like) that may be stored or transmitted by the user device. As shown in FIG. 7A, similar to the example of FIG. 6A, the user began typing a word 714 beginning with letters "a", "c", and "c" with her finger 710.

Every symbol (e.g. letter) on the keyboard may be assigned a probability value corresponding to a probability of appearance of the letter after the letter combination "acc." For example, generally, "e" has a highest probability of following "acc," "i" has a second highest probability of following "acc," "l" has a third highest probability of following "acc" and so on, as shown by the graph 730. If a user touched the screen in the keyboard area 712, the "candidates" for the user selection may be considered among the selectable objects indicating the letters within the area 712, as discussed in reference to FIG. 6A.

In one example, every selectable object within the area 712 will have the touch detection area of the same size. Accordingly, it may be determined, based on the above statistical probabilities that the user most likely intended to select the selectable element corresponding to the letter "u" as indicated by numeral 720 in FIG. 7B. Thus, the system may respond to the user selection of an area 712 following the entry of the letters "acc" (FIG. 7A) by displaying the most probable letter to appear after "acc," namely, "u", as illustrated by numeral 724 in the screenshot 718 of FIG. 7B.

In another example, a statistical probability of appearance of each letter within the area 712 after "acc" may be determined using different techniques, such as using a Voronoi diagram. The touch detection areas for each letter within the area 712, based on the Voronoi diagram, may have different sizes. For example, the touch detection area for "u" may become bigger and the touch detection area for "j" may become smaller. Accordingly, it may be determined that the letter "u" should be displayed following "acc" as shown by 724 in FIG. 7B.

FIGS. 8A, 8B, and 8C illustrate example screenshots of user network pages 802, 822, and 830 displayed on a touch screen of a user device in accordance with an embodiment. The screenshots illustrated in FIGS. 8A, 8B, and 8C are shown for illustrative purposes only and should not be interpreted as limiting the scope of the various embodiments. Page 802 illustrated in FIG. 8A includes hyperlinks "Crisis in EU" 810, "Sports News" 812, and "Jazz Festival" 814. The user is attempting to select, e.g., touching with her finger 820, a hyperlink of the three hyperlinks rendered on the touch screen. As shown, the user touches the screen with her finger 820 in an area proximate to at least two hyperlinks, 812 and 814.

Because it is not clear which hyperlink the user intended to select, a user input determination technique may be applied as described above in reference to FIGS. 2-5. For example, one or more of the above described determination techniques may be employed in order to determine which hyperlink of the three is the most probable choice for the user to select. For example, a hyperlink most likely intended to be selected by the user may be determined based on the aggregated user behavior with regard to the Web page. Thus, it may be determined that a majority of users selected a particular one of the three hyperlinks, such as, for example, "Jazz Festival" hyperlink 814. It may be inferred that a user was most likely intending to select the same hyperlink, and the content associated with the most popular hyperlink among the two or more hyperlinks may be presented to the user. Alternatively or additionally, the hyperlink most likely intended to be selected by the user may be determined based on the user's personal pattern of behavior and/or other user input determination techniques as described above.

FIG. 8B illustrates a page 822 provided to the user based on the determination described above, namely, that the user intended to select the hyperlink "Jazz Festival" 814. Accordingly, the content 830 associated with the hyperlink 822 is retrieved and provided for display on the user device. However, selecting the hyperlink 822 and providing associated content 830 may be erroneous. For example, the user did not in fact intend to select the hyperlink 814, despite the determination that the link 822 must have been the most probable choice of the user selection. Accordingly, if the user is dissatisfied with the response provided by the user input determination application, the user may negate the response as described above, for example, by selecting a "back" button 828 as shown in FIG. 8B. The user then may be taken back to the previous screen illustrated in FIG. 8A. Alternatively, a response to the second most probable user selection among the three hyperlinks 810, 812, and 814 may be provided to the user. For example, it may be determined that the most probable user selection is the hyperlink 814 (the choice that the user negated), the second most probable user selection is the hyperlink 812, and the third most probable user selection is the hyperlink 810. Accordingly, a response to the second most probable user selection ("Sports News" 812) may be provided to the user on page 840. The response includes content 848 associated with the hyperlink 812. If a user negates the second most probable choice provided by the application, the user may be taken to a page including content associated with the third most probable user selection, e.g., hyperlink "Crisis in EU" 810.

As discussed above, the various embodiments can be implemented in a wide variety of operating environments which, in some cases, can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for determining user input on a touch screen of a user device, comprising:
    under control of one or more computer systems configured with executable instructions, receiving information about a user input provided by a user touching a touch screen of a user device, the user input indicating an area on the touch screen that is proximate to at least two selectable objects displayed on the touch screen, wherein each of the at least two selectable objects, if selected, initiates a response corresponding to the selection of the object by the user;

determining, in response to the user input and based on aggregated data reflecting prior user behavior of multiple users in previously selecting user interface objects, that the user input indicates an intention of the user to select one of the at least two selectable objects;

determining, based on the aggregated data, a first selectable object from among the at least two selectable objects that has a highest probability of being the object that the user intended to select with the user input, and a second selectable object from among the at least two selectable objects that has a second highest probability of being the object that the user intended to select with the user input, wherein the determined second selectable object is distinct from the determined selectable object;

providing a response to the user corresponding to a selection by the user of the determined first selectable object on the touch screen of the user device;

receiving feedback from the user indicating that the determined first selectable object was not the object that the user intended to select with the user input, wherein the received feedback does not indicate any of the at least two selectable objects that the user intended to select with the user input; and in response to the feedback and without further input from the user, providing a second response to the user corresponding to a selection by the user of the determined second selectable object on the touch screen of the user device.

2. The computer-implemented method of claim 1, wherein the determined first selectable object is at least one of a hyperlink, a button, or a key on a virtual keyboard that is displayed on the touch screen, and wherein the response corresponding to the selection of the determined first selectable object is at least one of providing first content associated with the hyperlink, providing second content associated with the button, or providing a symbol corresponding to the key on the virtual keyboard.

3. The computer-implemented method of claim 1, wherein the determining that the user input indicates an intention of the user to select one of the at least two selectable objects includes determining that a type of the user input is not a mistouch and is not a scroll.

4. The computer-implemented method of claim 1 further comprising, before the receiving of the information about the user input, generating the aggregated data by aggregating user behavior data for the multiple users, and wherein the user behavior data includes user input pattern data corresponding to transaction patterns for the multiple users.

5. A computer-implemented method comprising:

under control of one or more computer systems configured with executable instructions, receiving information about a user input provided by a user touching a touch screen of a user device, the touch screen displaying two or more selectable objects, wherein each of the two or more selectable objects, if selected, initiates a response corresponding to selection of the object by the user;

retrieving aggregated data reflecting prior user behavior of multiple users in previously selecting objects using prior user input;

determining, in response to the user input and based at least in part on the retrieved aggregated data, a selectable object from among the two or more selectable objects that has a highest likelihood of being an object that the user intended to select with the user input, and a second selectable object from among the two or more selectable objects as the object has a second highest likelihood of being the object that the user intended to select with the user input, the determined second selectable object being distinct from the determined selectable object;

providing a response to the user corresponding to selection by the user of the determined selectable object;

receiving feedback from the user indicating that the determined selectable object was not the object that the user intended to select with the user input, wherein the received feedback does not indicate which of the two or more selectable objects that the user intended to select with the user input; and in response to the feedback and without further input from the user, providing a second response to the user corresponding to selection by the user of the determined second selectable object.

6. The computer-implemented method of claim 5 further comprising, before the receiving of the information about the user input, generating the aggregated data by aggregating user behavior data from prior actions of the multiple users.

7. The computer-implemented method of claim 6, wherein the user behavior data includes user input pattern data corresponding to transaction patterns for the multiple users.

8. The computer-implemented method of claim 5 wherein the two or more selectable objects include multiple selectable objects that are each one of multiple keys on a virtual keyboard provided on the touch screen of the user device, and wherein the determining of the selectable object includes, based on at least one of a personal dictionary associated with the user and a statistical analysis of spelling words in a language associated with the user device, identifying a symbol most likely to follow a sequence of symbols corresponding to keys already selected by the user on the virtual keyboard, the sequence of symbols forming at least a part of a word that the user intends to enter; and wherein the providing of the response includes causing the identified symbol to be displayed on the touch screen of the user device as a next symbol in the sequence of symbols.

9. The computer-implemented method of claim 5 wherein the two or more selectable objects include multiple selectable objects that each correspond to one of multiple hyperlinks included in a Web page displayed on the touch screen of the user device, and wherein the determining of the selectable object includes determining a first hyperlink that the user most likely intended to select;

wherein the determining of the second selectable object includes determining a second hyperlink that the user most likely intended to select if the first hyperlink was not intended to be selected by the user;

wherein the providing of the response includes providing content associated with the determined first hyperlink for display to the user on the user device; and wherein the provided second response includes providing second content associated with the determined second hyperlink for display to the user on the user device.

10. The computer-implemented method of claim 5 wherein the determining of the selectable object is further based in part on information specific to the user that reflects preferences of the user in selecting content.

11. The computer-implemented method of claim 5 wherein the one or more computer systems include the user device.

12. The computer-implemented method of claim 5 wherein the two or more selectable objects include three or more selectable objects displayed on the touch screen, and wherein the provided user input indicates an area on the touch screen that is proximate to at least two of the three or more selectable objects.

13. The computer-implemented method of claim 12 further comprising:
    determining that each of the at least two selectable objects has a likelihood of being an object that the user intended to select and that the probabilities for the at least two selectable objects are higher than other probabilities associated with other displayed selectable objects, wherein the probabilities associated with the at least two selectable objects are determined to be within a determined margin from each other; and
    based on the probabilities associated with the at least two selectable objects being determined to be within a determined margin from each other, causing each of the at least two selectable objects to be provided for display on the touch screen of the user device in an enlarged manner to enable further selection by the user of one of the at least two selectable objects.

14. The computer-implemented method of claim 5 further comprising determining that a type of the provided user input is not a mistouch and is not a scroll.

15. A computer system comprising:
    at least one processor; and
    at least one memory having computer-executable instructions that, when executed on the at least one processor, cause the at least one processor to:
        receive information about a first user input provided by a user touching a touch screen, the touch screen displaying two or more selectable objects, wherein each of the two or more selectable objects, if selected, initiates a response corresponding to selection of the object by the user;
        determine a selectable object among the two or more selectable objects that has a highest likelihood of being an object that the user intended to select with the first user input;
        provide a response to the user corresponding to the first user input having selected the determined selectable object;
        receive feedback from the user indicating that the determined selectable object was not the object that the user intended to select with the first user input, wherein the received feedback does not indicate any of the two or more selectable objects that the user intended to select with the first user input; and
        in response to the received feedback and without further input from the user, determine a second selectable object among the two or more selectable objects that is a next likely object that the user intended to select with the first user input, and provide a second response to the user corresponding to the first user input having previously selected the determined second selectable object instead of the determined selectable object.

16. The computer system of claim 15 wherein the computer-executable instructions further cause the at least one processor to aggregate user behavior data reflecting prior user behavior of multiple users in previously selecting objects using prior user input, and wherein the determining of the selectable object among the two or more selectable objects is based at least in part on the aggregated user behavior data.

17. The computer system of claim 16 wherein the user behavior data includes user input pattern data corresponding to transaction patterns for the multiple users.

18. The computer system of claim 17 wherein the user behavior data further includes a collection of preferences of the user in selecting types of content and information about prior behavior of the user with regard to accessing a particular network resource, and wherein the user input pattern data includes spelling patterns of words in a language.

19. The computer system of claim 15 wherein the touch screen is associated with a user device configured to receive the first user input provided to the touch screen, and wherein the determining of the second selectable object includes determining that the determined second selectable object has a next highest likelihood of being an object that the user intended to select with the first user input if the determined selectable object is not intended to be selected by the user with the first user input.

20. A non-transitory computer-readable medium having computer-executable instructions stored thereon that, when executed by a computer, cause the computer to:
    obtain aggregated data reflecting prior user behavior of multiple users in previously selecting objects using prior user input;
    receive information about a first user input provided by touching a touch screen of a user device, the touch screen displaying two or more selectable objects, wherein each of the two or more selectable objects, if selected, initiates a response corresponding to selection of the object;
    determine, based at least in part on the obtained aggregated data, a selectable object among the two or more selectable objects that has a highest likelihood of being an object that a user intended to select with the first user input;
    provide a response corresponding to selection of the determined selectable object;
    receive feedback indicating that the determined selectable object was not the object that was intended to be selected with the first user input, wherein the received feedback does not indicate which of the two or more selectable objects was intended to be selected with the first user input;
    determine a second selectable object among the two or more selectable objects that has a next highest likelihood as the object that was intended to previously be selected with the first user input, the determined second selectable object being distinct from the determined selectable object; and
    after the feedback and without further input from the user, provide a second response that is based on the determined second selectable object.

21. The non-transitory computer-readable medium of claim 20 wherein the computer-executable instructions further cause the computer to generate the aggregated data by aggregating user behavior data from prior actions of the multiple users.

22. The non-transitory computer-readable medium of claim 20 wherein the first user input provided to the touch screen is based on the user touching the touch screen in at least one location, and wherein the computer-executable instructions further cause the computer to store user behavior data associated with the received user feedback.

23. The non-transitory computer-readable medium of claim 20 wherein the provided second response corresponds to the first user input having previously selected the determined second selectable object by the user instead of the determined selectable object.

24. The non-transitory computer-readable medium of claim 23, wherein the two or more selectable objects are included in a Web page displayed on the touch screen by a browser associated with the user device.

25. The non-transitory computer-readable medium of claim 24 wherein the provided response includes first content associated with the selection of the determined selectable object, and wherein the provided second response includes second content associated with the selection of the determined second selectable object.

* * * * *